（12）United States Patent
Tran

(10) Patent No.: US 7,024,493 B1
(45) Date of Patent: Apr. 4, 2006

(54) BOOTABLE CD FOR TRANSFERRING FILES INDEPENDENTLY OF COMPUTER OPERATING SYSTEMS

(75) Inventor: Huy Ngoc Tran, Orlando, FL (US)

(73) Assignee: Adaptec, Inc., Milpitas, CA (US)

( * ) Notice: Subject to any disclaimer, the term of this patent is extended or adjusted under 35 U.S.C. 154(b) by 215 days.

(21) Appl. No.: 10/640,931

(22) Filed: Aug. 14, 2003

(51) Int. Cl.
*G06F 3/00* (2006.01)

(52) U.S. Cl. ............................ 710/1; 710/65; 710/104; 713/2; 719/319

(58) Field of Classification Search ............ 710/65–68; 713/1, 2
See application file for complete search history.

(56) References Cited

U.S. PATENT DOCUMENTS

| | | | |
|---|---|---|---|
| 5,418,918 A | 5/1995 | Vander Kamp et al. | |
| 5,727,213 A | 3/1998 | Vander Kamp et al. | |
| 5,894,571 A | 4/1999 | O'Connor | |
| 5,951,684 A | 9/1999 | Jeon | |
| 6,122,734 A | 9/2000 | Jeon | |
| 6,279,109 B1 * | 8/2001 | Brundridge | 713/2 |
| 6,304,965 B1 | 10/2001 | Rickey | |
| 6,357,000 B1 * | 3/2002 | Jain | 713/1 |
| 6,631,468 B1 * | 10/2003 | von Below | 712/2 |

OTHER PUBLICATIONS

Curtis E. Stevens, Stan Merkin, Phoenix Technologies and IBM, "El Torito" Bootable CD-ROM Format Specification, Version 1.0, Jan. 25, 1995, 20 pp.

* cited by examiner

*Primary Examiner*—Kim Huynh
*Assistant Examiner*—Eron Sorrell
(74) *Attorney, Agent, or Firm*—James H. Beusse; Beusse Brownlee Wolter Mora & Maire, P.A.

(57) ABSTRACT

A method of transferring CD ROM formatted files independently of operating systems. The method includes booting a computer with an operating system kernel loaded from a bootable CD ROM, and loading a file transfer application. The application can recognize CD ROM formatted files and can write selected files to a writeable CD ROM. The method further includes replacing the bootable CD ROM with a writeable CD ROM after the file transfer application is loaded, and copying the CD ROM formatted files from the computer to the writeable CD ROM. The method may also include selecting files on a computer's hard drive, converting the files to a CD ROM format and writing the files to a writeable CD ROM. A bootable CD having a bootable hard disk data structure, an operating system kernel, and an application for reading and burning ISO 9660 images and hard drive content to a writeable CD ROM is described.

22 Claims, 1 Drawing Sheet

BOOTABLE CD FOR TRANSFERRING FILES INDEPENDENTLY OF COMPUTER OPERATING SYSTEMS

BACKGROUND OF THE INVENTION

1. Field of the Invention

The present invention is generally related to computer system storage media, and, specifically, to a bootable CD and method for transferring files to a writeable CD independently of computer operating systems.

2. Related Art

It is known to boot computers from a CD-ROM by using a floppy drive image stored in a boot record of the CD-ROM. One example of such a bootable CD-ROM is disclosed in U.S. Pat. No. 5,727,213. For many bootable applications, this method is sufficient for booting an operating system kernel and mounting the CD drive, for example, to repair a hard disk drive having a corrupted boot sector. However, the relatively limited amount of data capable of being stored in a floppy image restricts the use of this booting method to bootstrapping applications. If a user desires to run an application directly from a bootable CD, such as a CD R/W application, other methods must be employed. For example, the "El Torito" specification, developed by Phoenix Technologies, Incorporated and IBM Corporation, provides hard disk drive emulation for booting from a CD Rom using a hard disk drive boot sector image. The El Torito CD booting specification relies on an El Torito enabled BIOS and a boot loader to load the boot image from the bootable CD and associated tools into the computer's RAM. Although this configuration may require loading of the appropriate CD drive software driver, the booting process and the loading of the application are computer operating system independent because the booting process relies on the computer BIOS to load the application and the dependent software.

The operating system Linux, available from Red Hat, Incorporated, for example, provides a tool, mkisofs, to allow creating a bootable hard disk drive image on a CD using the El Torito standard for hard drive emulation. However, bootable CD's created using the Linux tool may be incompatible with some system BIOSes because mkisofs does not clear out partitions beyond the first partition in the partition table. Consequently, a bootable CD created using the Linux tool may not be bootable across all platforms strictly adhering to the El Torito Specification.

SUMMARY OF THE INVENTION

A method of transferring files across different computer platforms is disclosed herein as including formatting data into a CD compatible image on a first computer system, and transferring the CD compatible image to a hard drive of a second computer system. The method also includes loading an operating system kernel and a CD burning application from a bootable CD inserted in the second computer. The method further includes removing the bootable CD and inserting a writeable CD in the second computer, and executing the CD burning application to copy the image transferred to the hard drive of the second computer to the writeable CD. The method may further include recognizing a bootable hard disk drive disk image on a bootable CD installed in the auxiliary drive on the computer during a BIOS routine.

In another aspect, a bootable CD having a bootable hard disk drive image for burning a writeable CD ROM is described herein as including a bootable hard disk data structure for allowing a host computer to recognize and boot from the bootable CD. The bootable CD also includes an operating system kernel for operating the host computer system. The bootable CD further includes an application for recognizing CD ROM formatted files on the computer, and writing the CD ROM formatted files to a writeable CD ROM.

DESCRIPTION OF THE DRAWINGS

The invention will become apparent from the following detailed description of the invention when read with the accompanying drawings in which.

Figure 1:
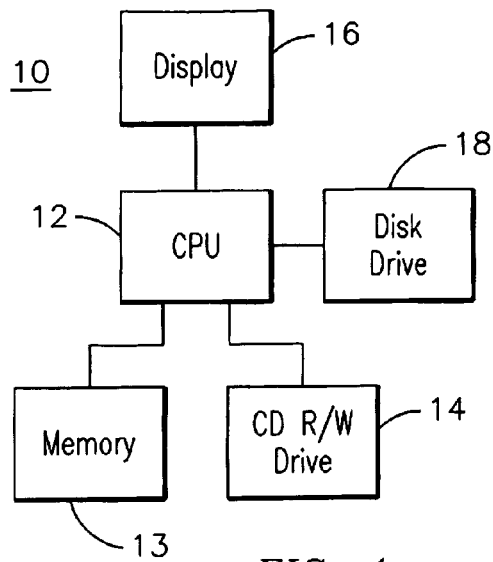
FIG. 1 depicts a computer system for performing a method of transferring files independently of operating systems.

In certain situations, for reasons of computational efficiency or ease of maintenance, the ordering of the blocks of the illustrated flow chart could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

FIG. 1 depicts a computer system for performing a method of transferring files independently of operating systems. For purposes of this invention, the term transferring is meant to include copying data from one computer storage media to another computer storage media such as by copying files or burning images. Typically, a computer system 10 includes a computer processing unit (CPU) 12 in communication with a memory 13, a computer storage subsystem, such as a hard disk drive 18, and a display 16. The computer 10 may also include a compact disk drive (CD R/W drive) 14 computer storage subsystem that is readable and writeable for loading and storing information, respectively, on a CD R/W disk (not shown) installed in the CD R/W drive 14. In an aspect of the invention, a bootable CD for loading information into the computer 10 is encoded with an operating system kernel and an application for transporting files across different operating systems. For example, regardless of the computer's 10 native operating system, or regardless of whether an operating system is installed, and provided that the computer's native file system can be read, files, such as CD ROM formatted files, located on the hard disk 18 may be copied to a writeable CD R/W disk placed in the CD R/W drive after the bootable CD is removed. In an aspect of the invention, the kernel and application written on the bootable CD can recognize a variety of file systems, such as the Windows NT file system (NTFS) or the Linux EXT2 file system.

In a further aspect of the invention, the bootable CD may include a hard disk drive image to allow the computer to recognize and boot from the bootable CD. For example, the hard disk drive image may be written to the bootable CD using the "El Torito" standard as recognized in the art. In addition, a partition table stored in the hard disk drive image under the El Torito standard may be cleared after the first partition entry to ensure compatibility among different operating systems. The bootable CD may also include an operating system kernel to load onto the computer 10. For example, a Linux kernel, a Windows PE kernel, or DOS may be used as the operating system kernel. The bootable CD may further include an application to be loaded onto the computer 10 and run from the computer 10 on the operating system kernel also loaded from the bootable CD.

Figure 2:
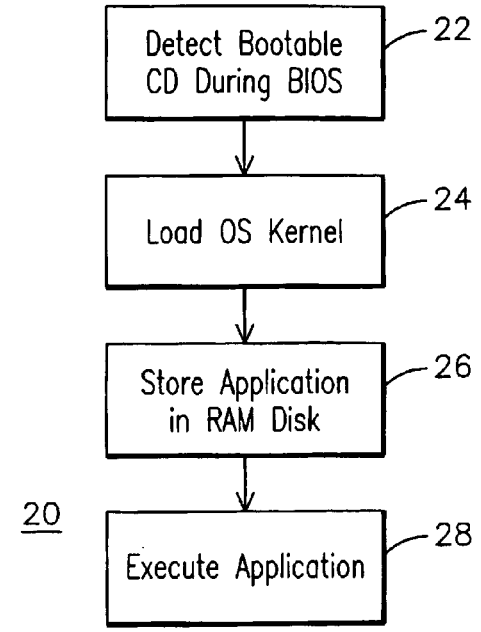
FIG. 2 is a flow chart illustrating a method of transferring files independently of operating systems.

FIG. 2 is a flow chart illustrating a method of transporting files independently of operating systems that may be implemented, for example, with the computer system 10 of FIG. 1. Generally, the method 20 includes detecting a bootable CD in the CD R/W drive 14 of the computer 10 during performance of a BIOS routine 22. Next, an operating system kernel is loaded 24 onto the computer 10 from the bootable CD detected in the CD R/W drive 14. In one form, the operating system loaded from the bootable CD may be different than the computer's 10 native operating system. Next, an application is stored 26, for example, in RAM disk on the computer 10, and the application may be executed 28 under the operating system kernel loaded from the bootable CD. Accordingly, because an independent operating system is loaded in the computer 10, files can be copied from a recognized storage location on the computer even if a different operating system file storage format was used to store the files.

Figure 3:
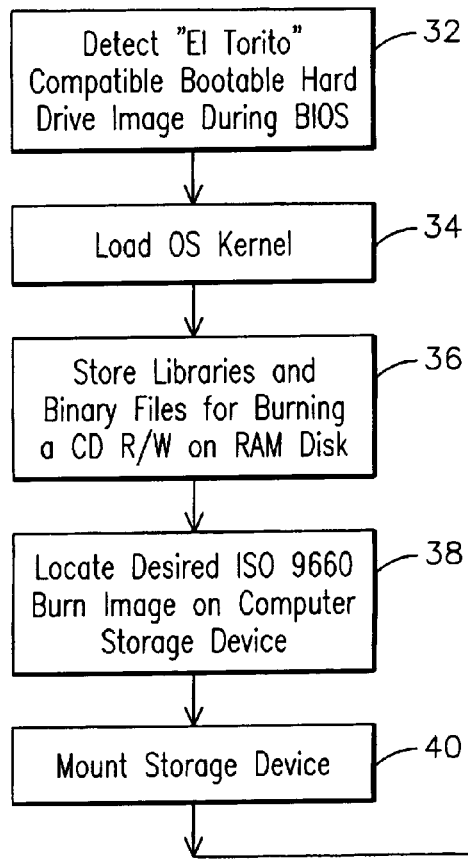
FIG. 3 is a more detailed method of the flow chart illustrated in FIG. 2.
Figure 3:
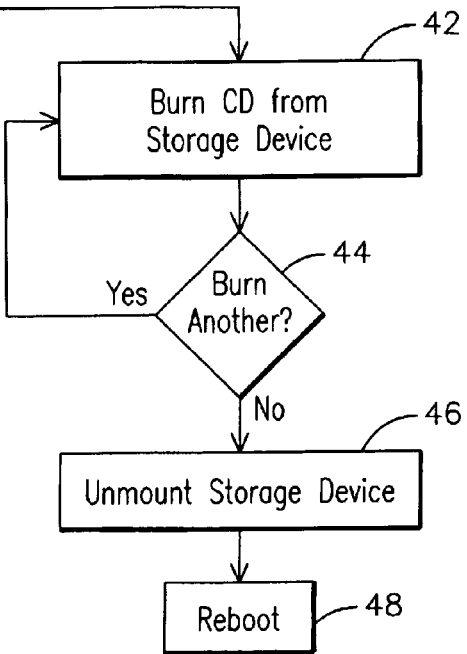

FIG. 3 is a more detailed method of the flow chart illustrated in FIG. 2, including steps for a CD R/W burning technique. According to the method shown in FIG. 3, a bootable CD can be used to transfer CD ROM compatible files, such as an ISO 9660 compatible image, from the computer's hard disk drive 18 to a CD R/W disk, using a single CD R/W drive 14, without requiring use of the computer's native operating system or CD burning software to be installed. Initially, a bootable CD, formatted to include a bootable hard disk drive image such as an El Torito image, an operating system kernel, and a CD ROM image burning application is placed in the CD R/W drive 14 of the computer 10. The method 30 begins by detecting an El Torito compatible bootable hard disk drive image during BIOS routine 32. An operating system kernel is then loaded 34 onto the computer 10 from the bootable CD. Next, an application, including, for example, libraries and binary files for burning a CD R/W, are loaded 36 onto the computer 10 from the bootable CD. After the application is loaded onto the computer 10, the operating system kernel, and the libraries and binaries needed to run the application, reside on the computer 10, such as in the computer's memory 13 as a RAMdisk, so that there are no dependencies on the bootable CD. Accordingly, the bootable CD may be removed from the CD R/W drive 14 and a writeable CD R/W disk may then be inserted into the CD R/W drive 14.

Once the application is loaded, a desired ISO 9660 CD burning image is then located on a computer system storage device 38, such as the computer's hard disk drive 18. For example, a CD burning image may have been stored previously on a hard disk drive 18 of the computer 10, such as via transfer over a network from another computer. In an aspect of the invention, the CD burning image may be automatically located or a simple user interface (UI) may be provided by the loaded operating system kernel to allow a user to select a desired burning image or images to be copied to a CD R/W disk. After the burning image is located, the storage device, such as a hard disk drive 18, is mounted 40, and the CD R/W disk is burned from the storage device 42 with the desired burning image. If more CD R/W disks are desired to be burned, the burned CD R/W disk can be removed, and a new CD R/W disk can be inserted in the CD R/W Drive 14 for burning. This process can be performed as many times as desired. After the desired number of CD R/W disks have been burned, the storage device is unmounted 46 and the computer 10 can be rebooted 48 to allow computer processing under the computer's native operating system.

In a further embodiment, the method may include creating a CD ROM compatible image of a group of files or a directory selected from a storage device of the computer 10, and burning the image to a CD R/W disk, for example, for backup purposes. Accordingly, the bootable CD ROM includes an operating system kernel that provides a simple UI to allow a user to select the desired files or directories, and an application for converting the selected files or directories into a CD ROM compatible image for burning.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard disks, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method of loading a CD burning application from an auxiliary drive of a first computer to RAM memory in the first computer such that the CD burning application is operable in the first computer without further communication from the auxiliary drive so that CD image files may be transferred from the first computer to a second computer having an operating system different from the first computer, the method including:
   recognizing a bootable hard disk drive disk image on a bootable CD installed in a the auxiliary drive on the computer during a BIOS routine:
   loading an operating system kernel from the bootable CD to operate the computer system and communicate with the auxiliary drive without requiring the use of a native operating system resident in the computer;
   loading the CD burning application from the bootable CD;
   replacing the bootable CD with a writeable CD; and
   executing the CD burning application via the operating system kernel.

2. The method of claim 1, further comprising encoding a CD with a bootable hard disk drive disk image comprising a CD burning application.

3. The method of claim 2, further comprising clearing partition entry pointers in the bootable hard drive disk image except for a first partition table entry.

4. The method of claim 1, further comprising:
   locating an existing CD image file on the computer system; and
   writing the existing CD image file to the auxiliary drive.

5. The method of claim 4, wherein the auxillary drive is a CD-R/W drive.

6. The method of claim 1, wherein the CD image file is ISO 9660 compatible.

7. The method of claim 5, wherein the bootable hard disk drive disk image is El Torito compliant.

8. The method of claim 7, wherein a BIOS of the computer is capable of recognizing an El Torito compatible bootable hard disk drive image.

9. A method of booting a computer from a bootable CD so that CD image files may be transferred from the first computer to a second computer having an operating system different from the first computer by burning the files to a writeable CD comprising:
   recognizing a bootable hard disk drive disk image on the bootable CD during a BIOS routine;
   loading an operating system kernel from the bootable CD to operate the computer system and communicate with the auxiliary drive without requiring the use of a native operating system resident in the computer;
   loading a CD burning application from the bootable hard disk drive image into a ramdisk on the computer;
   replacing the bootable CD with a writeable CD;
   locating a CD image file on the computer; and
   executing the CD burning application from the ramdisk via the operating system kernel to burn the writable CD with the CD image file.

10. The method of claim 9, wherein the image file is ISO 9660 compatible.

11. The method of claim 9, wherein the image file is El Torito compatible.

12. The method of claim 9, wherein a BIOS of the computer is capable of recognizing an El Torito compatible bootable hard disk drive image.

13. A method of transferring CD ROM formatted files between different operating systems comprising:
   booting a computer with an operating system kernel loaded from a bootable CD ROM to allow operation of the computer without requiring the use of a native operating system resident in the computer;
   loading a file transfer application for recognizing CD ROM formatted files on the computer and writing the CD ROM formatted files to a writeable CD ROM;
   replacing the bootable CD ROM with a writeable CD ROM; and
   transferring CD ROM formatted files from the computer to the writeable CD ROM using the file transfer application running on the operating system kernel.

14. The method of claim 13, wherein the CD ROM formatted files are ISO 9660 compatible.

15. The method of claim 13, wherein the file transfer application further comprises a conversion utility for recognizing user selected hard drive content, converting selected hard drive content into backup CD ROM formatted files, and writing the backup CD ROM formatted files to a writeable CD ROM.

16. The method of claim 15, further comprising transferring user selected hard drive content from the computer to the writeable CD ROM.

17. A bootable CD for transferring CD ROM formatted files from the first computer to a second computer having an operating system different from the first computer by burning selected ones of the CD ROM formatted files onto a writeable CD ROM comprising:
   a bootable hard disk data structure for allowing a host computer to recognize and boot from the bootable CD;
   an operating system kernel for operating the host computer system without requiring the use of a native operating system resident in the computer; and
   an application executable by the operating system kernel for recognizing CD ROM formatted files on the computer and writing selected ones of the CD ROM formatted files to a writeable CD ROM.

18. The bootable CD of claim 17, further comprising a partition table having only one partition table entry pointing to a first partition.

19. A method of burning ISO 9660 images independently of an operating system comprising:
   inserting a bootable CD into a CD R/W drive of a first computer, the bootable CD comprising an operating system kernel allowing operation of the first computer without requiring the use of a native operating system resident in the computer and a CD burning application;
   restarting the first computer to boot from the bootable CD and to load the operating system kernel and the CD burning application from the bootable CD;
   removing the bootable CD;
   inserting a writeable CD in the computer; and
   executing the CD burning application via the operating system kernel to copy an ISO 9660 image located on the hard drive of the first computer to the writeable CD.

20. The method of claim 19, further comprising;
   formatting data on a second computer system into the ISO 9660 image;
   transferring the image to a hard drive of a first computer.

21. The method of claim 19, the bootable CD further comprising a conversion utility for selecting and converting hard drive content into a backup ISO 9660 image.

22. The method of claim 21, further comprising executing the conversion application to select hard drive content on the first computer and to convert selected hard drive content into a backup ISO 9660 image for burning to the writeable CD.

* * * * *